(12) United States Patent
Lou et al.

(10) Patent No.: US 10,389,513 B2
(45) Date of Patent: Aug. 20, 2019

(54) DYNAMIC ADJUSTMENT OF WAIT TIME VALUES

(71) Applicant: Hewlett Packard Enterprise Development LP, Houston, TX (US)

(72) Inventors: Ju-Chun Lou, Taipei (TW); Chi-Yuan Hung, Taipei (TW); I-Chun Shih, Taipei (TW)

(73) Assignee: Hewlett Packard Enterprise Development LP, Houston, TX (US)

( * ) Notice: Subject to any disclaimer, the term of this patent is extended or adjusted under 35 U.S.C. 154(b) by 262 days.

(21) Appl. No.: 15/416,756

(22) Filed: Jan. 26, 2017

(65) Prior Publication Data

US 2018/0212747 A1    Jul. 26, 2018

(51) Int. Cl.
| G06F 15/173 | (2006.01) |
| H04L 7/00 | (2006.01) |
| H04L 12/26 | (2006.01) |
| H04L 12/24 | (2006.01) |

(52) U.S. Cl.
CPC ........ *H04L 7/0041* (2013.01); *H04L 43/0864* (2013.01); *H04L 43/10* (2013.01); *H04L 41/147* (2013.01)

(58) Field of Classification Search
CPC .... H04L 7/0041; H04L 43/0864; H04L 43/10
USPC ........................................................ 709/248
See application file for complete search history.

(56) References Cited

U.S. PATENT DOCUMENTS

| 6,526,433 | B1 | 2/2003 | Chang et al. | |
| 7,953,870 | B1 | 5/2011 | Reeves et al. | |
| 8,781,049 | B1 * | 7/2014 | Belitzer | H03L 7/08 |
| | | | | 375/224 |
| 8,812,725 | B2 * | 8/2014 | Kulkarni | H04L 43/0852 |
| | | | | 709/225 |
| 8,966,487 | B1 | 2/2015 | Leonard | |
| 9,009,305 | B1 * | 4/2015 | Callau | H04L 29/06 |
| | | | | 370/230 |
| 9,019,854 | B2 * | 4/2015 | Jonsson | H04L 41/0816 |
| | | | | 370/252 |
| 9,077,630 | B2 * | 7/2015 | Backholm | H04L 47/20 |

(Continued)

OTHER PUBLICATIONS

Kianpisheh, S. et al., "Predicting Job Wait Time in Grid Environment by Applying Machine Learning Methods on Historical Information", International Journal of Grid and Distributed Computing, vol. 5, No. 3, Sep. 2012, 12 pages.

*Primary Examiner* — Melvin H Pollack
(74) *Attorney, Agent, or Firm* — Hewlett Packard Enterprise Patent Department

(57) ABSTRACT

Examples disclosed herein relate to a mechanism for dynamically adjusting wait time values. Some disclosed examples enable transmitting, by a source entity, a request for an action to a target entity. The action may be generated by the source entity. Some examples enable identifying a first wait time value for the source entity that indicates an amount of time that the source entity is allowed to wait for a response from the target entity between the transmission of the request and a timeout state. Some examples may enable dynamically adjusting the first wait time value based on an entity specification of the source or target entity to generate a second wait time value. Some examples may enable allowing the source entity to wait for the response from the target entity for at least the amount of time indicated in the second wait time value.

20 Claims, 5 Drawing Sheets

(56) References Cited

U.S. PATENT DOCUMENTS

| | | | |
|---|---|---|---|
| 9,319,218 B2* | 4/2016 | Pandey | H04B 3/00 |
| 9,344,908 B2* | 5/2016 | Wynn | H04L 41/5067 |
| 9,525,641 B1* | 12/2016 | Greene | H04L 47/30 |
| 9,813,259 B2* | 11/2017 | Vasseur | H04L 47/115 |
| 9,832,095 B2* | 11/2017 | Bott | H04L 43/0876 |
| 9,832,096 B2* | 11/2017 | Verma | H04L 12/4633 |
| 9,839,001 B2* | 12/2017 | Choi | H04W 68/02 |
| 2013/0080635 A1 | 3/2013 | Ho et al. | |
| 2015/0288586 A1* | 10/2015 | McClellan | H04L 41/142 709/224 |
| 2016/0150589 A1 | 5/2016 | Zhao et al. | |
| 2017/0063705 A1* | 3/2017 | Gilson | H04L 47/286 |
| 2017/0094296 A1* | 3/2017 | Gu | H04N 19/105 |
| 2017/0127408 A1* | 5/2017 | Du | H04B 17/318 |
| 2017/0289000 A1* | 10/2017 | Park | H04L 43/04 |

* cited by examiner

DYNAMIC ADJUSTMENT OF WAIT TIME VALUES

BACKGROUND

After a source entity sends a request for action to be fulfilled by a target entity, a wait state mechanism of the source entity may wait for a response from the target entity for a certain time period that is usually set by a predefined or fixed wait time value. A request timeout may occur when a response has not been received from the target entity within the designated time period after transmitting the request.

BRIEF DESCRIPTION OF THE DRAWINGS

The following detailed description references the drawings, wherein.

DETAILED DESCRIPTION

Figure 1:
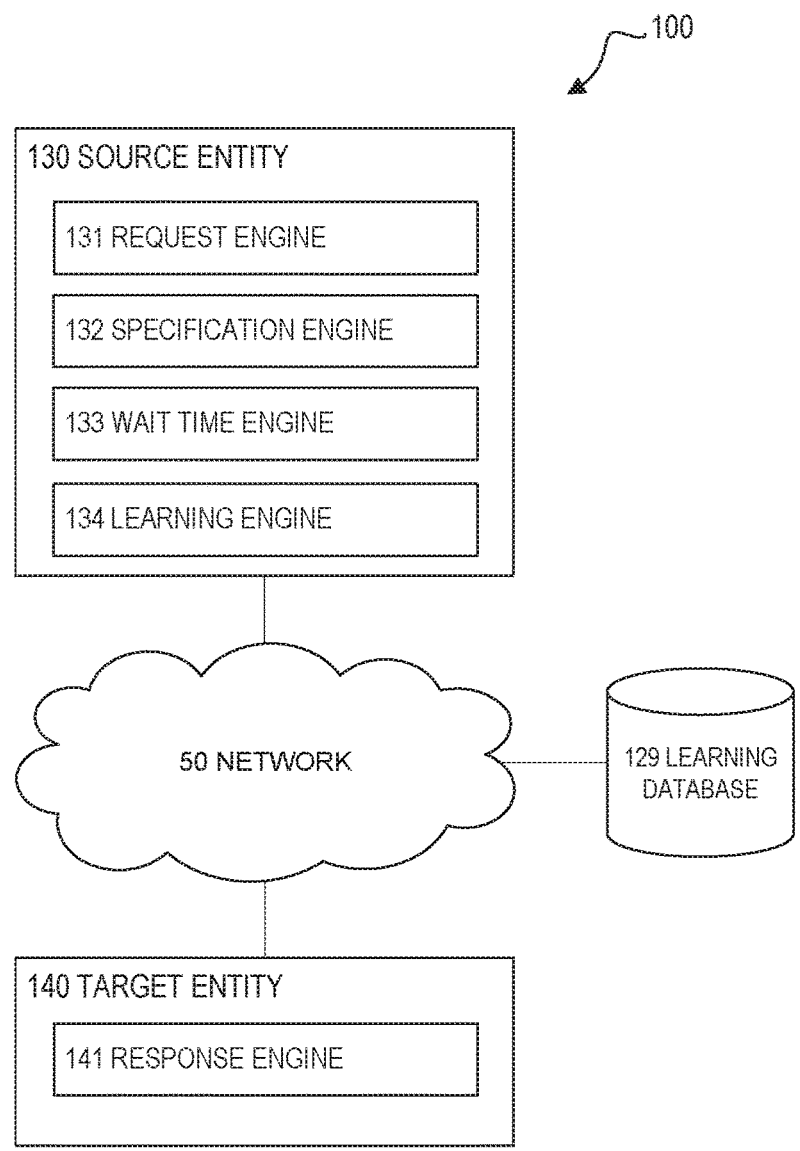
FIG. 1 is a block diagram depicting an example wait time adjustment system comprising various components including a source entity in communication with a target entity for dynamically adjusting wait time values.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

After a source entity sends a request for action to be fulfilled by a target entity, a wait state mechanism of the source entity may wait for a response from the target entity for a certain time period that is usually set by a predefined or fixed wait time value. A request timeout may occur when a response has not been received from the target entity within the designated time period after transmitting the request. When a timeout occurs, the request may be aborted and need to be re-sent to the target entity, causing a delay in processing the request.

In an example scenario, the target entity may send a response to the source entity, but the response is received by the source entity after the time period designated by the predefined or fixed wait time value already passed. In this example scenario, simply increasing the wait time value can avoid an unwanted timeout situation. However, there are many challenges to this solution. To adjust a predefined, fixed wait time value, a software patch to or a new build of the wait time mechanism should be provided. Even if such a patch or new build is provided, the adjusted wait time value in the patch or new build is still fixed. This means that the resulting wait time value may not be appropriate for all types of scenarios that can occur. For example, for a high performance server (e.g., target entity) on a high speed network, the processing time and response time of the server may be expected to be shorter. If the wait time value is adjusted down (e.g., decreased) to accommodate this particular scenario, the decreased wait time value may create many unwanted timeout events for any other servers with lower performance level and/or on a network with a lower speed. Moreover, if the target entity is too busy to process and/or respond to the request from the source entity, an increased wait time value may cause the source entity to wait for an unreasonably long time, resulting in an inefficient utilization of resources at the source entity.

Examples disclosed herein provide technical solutions to these technical challenges by providing a mechanism for dynamically adjusting wait time values. Some disclosed examples enable transmitting, by a source entity, a request for an action to a target entity. The action may be generated by the source entity. Some examples enable identifying a first wait time value for the source entity that indicates an amount of time that the source entity is allowed to wait for a response from the target entity between the transmission of the request and a timeout state. Some examples may enable dynamically adjusting the first wait time value based on an entity specification of the source or target entity to generate a second wait time value. Some examples may enable allowing the source entity to wait for the response from the target entity for at least the amount of time indicated in the second wait time value.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

FIG. 1 is a block diagram depicting an example system 100 comprising various components including a source entity in communication with a target entity for dynamically adjusting wait time values.

The various components may include a source entity 130 and a target entity 140. Source entity 130 may communicate requests to and/or receive responses from target entity 140. Target entity 140 may receive and/or respond to requests from source entity 130.

A "source entity," as used herein, may refer to a computing device (e.g., a client computing device such as a laptop computing device, a desktop computing device, an all-in-one computing device, a thin client, a workstation, a tablet computing device, a mobile phone, an electronic book reader, a network-enabled appliance such as a "Smart" television, a server computing device, any virtual computing devices such as a virtual machine, container, etc., and/or other device suitable for execution of the functionality described below), a process within a computing device, and/or a state within a process. Similarly, a "target entity," as used herein, may refer to a computing device, a process within a computing device, and/or a state within a process. A "process," as used herein, may include a process task or a plurality of process tasks that are executed by a software application that runs on a computing device. A process may be in a particular "state" (as used herein) at a specific time. For example, a process may start from a waiting state and subsequently changed to a timeout state.

While source entity 130 is depicted as a single entity, source entity 130 may include any number of entities. For example, source entity 130 may represent a plurality of computing devices and/or a plurality of processes/states. Similarly, while target entity 140 is depicted as a single entity, target entity 140 may include any number of entities as discussed above. In some implementations, source entity 130 and target entity 140 may have a server-client relationship where one entity represents a client computing device while the other entity represents a server computing device. In some implementations, source entity 130 and target entity 140 may represent different processes within a single computing device. In other implementations, source entity 130 and target entity 140 may represent different states within a single process.

The various components (e.g., components 129, 130, and 140) depicted in FIG. 1 may be coupled to at least one other component via a network 50. Network 50 may comprise any infrastructure or combination of infrastructures that enable electronic communication between the components. In some examples, network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, a system bus (e.g., control bus, address bus, data bus, etc. that connect the major components of a computing device), and/or other network. According to various implementations, system 100 and the various components described herein may be implemented in hardware and/or programming that configures hardware. Furthermore, in FIG. 1 and other Figures described herein, different numbers of components or entities than depicted may be used.

Source entity 130 may comprise a request engine 131, a specification engine 132, a wait time engine 133, a learning engine 134, and/or other engines. The term "engine", as used herein, refers to a combination of hardware and programming that performs a designated function. As is illustrated respect to FIGS. 3-4, the hardware of each engine, for example, may include one or both of a processor and a machine-readable storage medium, while the programming is instructions or code stored on the machine-readable storage medium and executable by the processor to perform the designated function.

Request engine 131 may generate, by a source entity (e.g., source entity 130), a first request for an action to be responded by a target entity (e.g., target entity 140). An "action," as used herein, may refer to any actions relating to command distribution, process execution, communication protocol, and/or any other actions to be processed, executed, or otherwise fulfilled by a target entity. For example, an action of installing a new operating system (OS) at target entity 140 relates to command distribution. A request to initiate a new FTP/HTTP session or initiate a remote management is examples of an action relating communication protocol. A request to execute a certain process task (e.g., installing a new driver, invoking a new service, etc.) of a software application is an example of an action relating to process execution.

Request engine 131 may transmit to target entity 140 the request to be responded by target entity 140. The request may be transmitted via network 50 or any similar network that enables communication between source entity 130 and target entity 140. In some implementations, source entity 130 and target entity 140 may have a server-client relationship where one entity represents a client computing device while the other entity represents a server computing device. Hence, the transmission of the request and/or response may be communicated via network 50 (e.g., Internet) or any similar network that enables communication between the client computing device and the server computing device. In some implementations, source entity 130 and target entity 140 may represent different processes within a single computing device. In these implementations, one process may transmit a request for an action to be fulfilled by another process within a single computing device via network 50 (e.g., system bus) or any similar network that enables communication between two processes. In other implementations, source entity 130 and target entity 140 may represent different states within a single process. In this case, requests and/or responses may be transmitted between two different states within a single process.

Specification engine 132 may identify an entity specification of source entity 130 or target entity 140. As discussed herein with respect to wait time engine 133, the entity specification may be used to dynamically determine a degree of adjustment that should be made to a wait time value. By considering the entity-specific factors as part of equation for adjustment, a wait time value can be optimized for individual requests directed to respective entities. In this way, individual requests may be given different wait time values depending on source entity 130 that the request is generated and/or transmitted from, target entity 140 that the request is being transmitted to, and/or a connection between source entity and target entity 140. For example, if a request is directed to target entity 140 with a high performance central processing unit (CPU) where the wait time is expected to be shorter, the wait time value may be adjusted down (e.g., decreased) to shorten the required wait time and free up the resources at source entity 130.

The "entity specification," as used herein, may comprise a hardware specification, a service specification, a software specification, an events specification, and/or other entity-specific specifications of a particular entity or of a particular computing device that the particular entity resides in. In the examples where a particular entity represents a computing device, the entity specification may be associated with that particular computing device (e.g., a processor specification of that computing device). In other examples where a particular entity is a process within a single computing device, the entity specification may be associated with the process itself and/or that computing device that the process resides in.

A hardware specification may comprise a processor specification (e.g., a manufacturer, core number, model, or other identifier, performance or speed, temperature, voltage, current, and/or other characteristics of a processor (CPU) in a respective entity), a memory specification (e.g., a manufacturer, number, model, or other identifier, capacity, data transfer rate, seek time, latency, I/O speed, temperature, voltage, current, and/or other characteristics of a cache memory, a main memory, and/or a secondary/non-volatile memory in a respective entity), and a network interface controller (NIC) specification (e.g., a manufacturer, number, model, or other identifier, I/O speed, temperature, voltage, current, and/or other characteristics of a NIC in a respective entity), and/or other specifications or characteristics related to any hardware components in a respective entity or a respective computing device that the respective entity resides in. The hardware specification may describe any hardware components in a physical computing device as well as similar components in a virtual computing device.

A service specification may comprise a service response of a database service, a service response of a file service, a service response of a web service, and/or other characteristics of services in a respective entity or a respective computing device that the respective entity resides in. A software specification may comprise identifiers of software, including system software (e.g., operating system (OS), firmware, etc.) and application software, and/or other characteristics of such software installed on a respective entity or a respective computing device that the respective entity resides in. For example, a software specification may specify an OS version that is installed on a respective computing device. An events specification may comprise information about events (e.g., error events, warning events, etc.) that are logged in any system logs (e.g., event logs) for a respective entity or a respective computing device that the respective entity resides in. In some situations, the events specification may provide information related to other types of entity specification, as discussed above. For example, a system log can provide information about the entity's hardware components such as CPU, memory, etc.

Specification engine 132 may identify and/or obtain an entity specification in a respective entity (or a respective computing device that the respective entity resides in) in various ways. In some implementations, an entity specification may be stored in and/or provided by a corresponding entity associated with the particular entity specification. For example, specification engine 132 may ping target entity 140 for the entity specification of target entity 140. Source entity 130 may ping target entity 140 to receive information about target entity 140's hardware specification. In other implementations, an entity specification of one or a plurality of entities may be stored in a centralized data repository to which various entities have access to identify and/or obtain such entity specification. For example, a system log of target entity 140 may be stored in a remote data repository where target entity 130 may access to retrieve at least a portion of the system log.

Wait time engine 133 may identify and/or adjust a wait time value for source entity 130. A "wait time value," as used herein, may indicate an amount of time that source entity 130 is allowed to wait for a response about the request until a timeout state. A "timeout state" may occur when a response has not been received from target entity 140 within a designated time period that is set by the wait time value after transmitting the request. When a timeout occurs, the request may be aborted. According to the wait time value, wait time engine 133 may allow the source entity to wait for a response from target entity 140 for at least the amount of time indicated in the wait time value.

Wait time engine 133 may dynamically adjust the wait time value based on various parameters. Various parameters may comprise any portion of an entity specification (as discussed herein with respect to specification engine 132) of source entity 130 and/or target entity 140, a network condition (e.g., condition of network 50) between source entity and target entity, and/or other parameters. A network condition may comprise information about network throughput, routing information, round trip time, etc. Any number of the aforementioned parameters may be used to determine a degree of adjustment needed for the wait time value. For example, for a server (e.g., target entity 140) with a high performance CPU on a high speed network, the processing time and response time of the server may be expected to be shorter. The wait time value may be dynamically adjusted down (e.g., decreased) to accommodate this particular scenario to cut down on the wait time to free up the resources at source entity 130. In another example, if source entity 130 transmits a request to a different server with lower performance level and/or on a network with a lower speed, the wait time value may be re-adjusted to increase the wait time value to avoid unwanted timeout states. In some implementations, wait time engine 133 may dynamically adjust the wait time value before wait time engine 133 enters into a wait state (e.g., before a state of wait time engine 133 indicates a wait state). The adjusted wait time value may indicate the amount of time from the wait state and the timeout state.

In some implementations, wait time engine 133 may rely on information gathered by learning engine 134 to determine a degree of adjustment, as further discussed below.

Learning engine 134 may store, in a learning database (e.g., learning database 129), a result of a particular request along with the entity specification and the wait time value that was used for the particular request. Consider the following example: the entity specification includes a plurality of factors such as (a) CPU core number, (b) I/O speed, and (c) OS version. A first request to install a new OS version in a first target entity may be generated by source entity 130 (e.g., generated by request engine 131 as discussed herein). A first wait time value that has been initially identified may be applied to the wait time mechanism. After the first request is sent to the first target entity, a result of this first request may indicate one of the following: (i) "True," indicating a response to the first request has been received from the first target entity where the response can be a successful installation or a failure to install, or (ii) "False," indicating no response has been received from the first target entity before a timeout state (e.g., set by the first wait time value) occurs. In this example, the first wait time value is identified as 10 seconds (or in any other unit of time such as nanoseconds, minutes, etc.). The entity specification factors associated with the first request include CPU core number and I/O speed (e.g., the first target entity has a processor with the identified CPU core number and I/O speed). After the first request is sent to the first target entity, the new OS has been successfully installed at the first target entity 140, and the first target entity 140 responds "True." Table 1 provides an example table in learning database 129 that captures the data collected thus far.

TABLE 1

| Factors | Current Wait Time Value | Average Wait Time Value | Result |
|---|---|---|---|
| CPU core number | 10 | 10 | True |
| I/O speed | 10 | 10 | True |

The first wait time value would not be adjusted at this point because the results were "True," indicating that the first wait time value (e.g., current wait time value in Table 1) was adequate for the first request. Because this was a first set of data collected by learning engine 134, the average wait time value would also indicate 10 seconds in Table 1.

Continuing with the above example, a second request to install a new OS version may be generated by source entity 130 (e.g., generated by request engine 131 as discussed herein). This time, the second request may be sent to a second target entity that is different from the first target entity to which the first request was transmitted. The second target entity has a processor with the same CPU core number as the first target entity, but the entity specification of the second target entity indicates that the second target entity has a particular OS version installed on the second target entity. The first wait time value, since it was not adjusted in the previous cycle (e.g., because the results were "True" in the previous cycle), is still applied to the wait time mechanism. After the second request is sent to the second target entity, a result of this second request indicates "False," indicating no response was received from the second target entity before a timeout state (e.g., set by the first wait time value) occurs. Table 2 provides an example table in learning database 129 that captures the data gathered thus far.

TABLE 2

| Factors | Current Wait Time Value | Average Wait Time Value | Result |
| --- | --- | --- | --- |
| CPU core number | 10 | 10 | True |
| I/O speed | 10 | 10 | True |
| OS version | 10 | 10 | False |

Now, the first wait time value would be adjusted (e.g., increased) to a second wait time value since the result indicated that the first wait time value was too short given the particular OS version. The second wait time value may be calculated by the following example equation: Second Wait Time Value=Average Wait Time Value*Factor Probability. The factor probability in the above example would be 33.3% since there was 33.3% probability of receiving a "False" result according to Table 2 (e.g., one "False" result and two "True" results). Based on this equation, the second wait time value would be calculated to be approximately 13 seconds. The second request may then be re-sent to the second target entity using the second wait time value. If the result is returned "True," Table 2 is updated with the second wait time value as shown in Table 3:

TABLE 3

| Factors | Current Wait Time Value | Average Wait Time Value | Result |
| --- | --- | --- | --- |
| CPU core number | 13 | 11.5 | True |
| I/O speed | 10 | 10 | True |
| OS version | 13 | 13 | True |

In Table 3, note that 11.5 represents an average of the first wait time value of 10 and the second wait time value of 13. The average wait time value for OS version is set to 13 because the result has changed from False to True. The previous value of 10 for OS version (in Table 2) is ignored (e.g., not be accounted for average wait time in Table 3) because it has been determined that the wait time value of 10 was not proper (e.g., too short) for the particular OS version. If a third request to install a new OS is made to a third target device that has the same OS version, the same CPU core number, and the same I/O speed as the second target device, note that the second wait time of 13 would be selected and applied to the wait state mechanism for the third request. The second wait time value of 13 is selected because it is a maximum value of the three current wait time values in Table 3. Learning database 129 may continue to be updated with actual data and/or training data to improve prediction and determination of proper wait time values.

Target entity 140 may comprise a response engine 141 and/or other engines.

Response engine 141 may receive, from source entity 130, a request for an action generated by source entity 130 (e.g., generated by request engine 131 as discussed herein). Response engine 141 may then generate or otherwise provide a response to the request. The response may comprise an indication that the action has been successfully processed, that the action has failed, and/or any other indications in response to the status of the action. Response engine 141 may transmit the response to source entity 130. In some implementations, the response may be stored in a system log of target entity 140. As discussed herein with respect to wait time engine 133, upon receiving a response from target entity 140, source entity 130 may adjust a wait time value based in part on the response.

In performing their respective functions, engines 131-133 and 141 may access learning database 129, and/or other suitable database(s). Learning database 129 may represent any memory accessible to system 100 that can be used to store and retrieve data. Learning database 129 and/or other database may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. System 100 may access learning database 129 locally or remotely via network 50 or other networks.

Learning database 129 may include a database to organize and store data. The database may reside in a single or multiple physical device(s) and in a single or multiple physical location(s). The database may store a plurality of types of data and/or files and associated data or file description, administrative information, or any other data.

Figure 2:
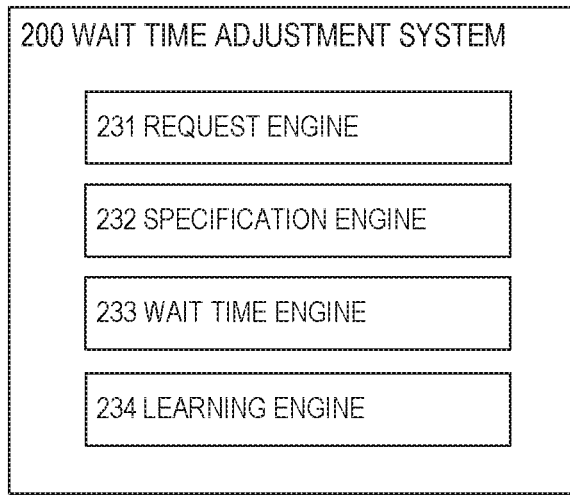
FIG. 2 is a block diagram depicting an example wait time adjustment system.

FIG. 2 is a block diagram depicting an example wait time adjustment system 200. Wait time adjustment system 200 may comprise a request engine 231, a specification engine 232, a wait time engine 233, a learning engine 234, and/or other engines. Engines 231-234 represent engines 131-134, respectively.

Figure 3:
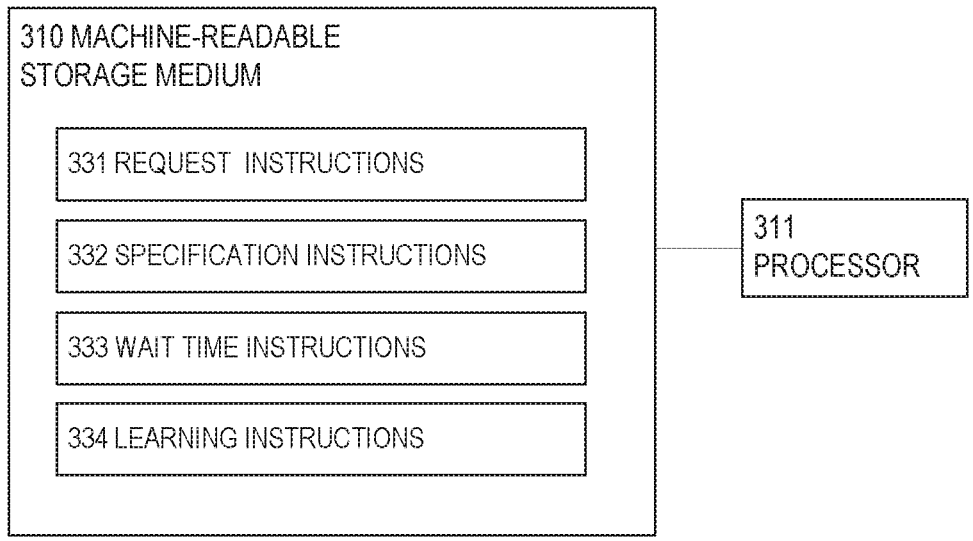
FIG. 3 is a block diagram depicting an example machine-readable storage medium comprising instructions executable by a processor for dynamically adjusting wait time values.

FIG. 3 is a block diagram depicting an example machine-readable storage medium 310 comprising instructions executable by a processor for dynamically adjusting wait time values.

In the foregoing discussion, engines 131-134 were described as combinations of hardware and programming. Engines 131-134 may be implemented in a number of fashions. Referring to FIG. 3, the programming may be processor executable instructions 331-334 stored on a machine-readable storage medium 310 and the hardware may include a processor 311 for executing those instructions. Thus, machine-readable storage medium 310 can be said to store program instructions or code that when executed by processor 311 implements engines 131-134 of FIG. 1.

In FIG. 3, the executable program instructions in machine-readable storage medium 310 are depicted as request instructions 331, specification instructions 332, wait time instructions 333, and learning instructions 334. Instructions 331-334 represent program instructions that, when executed, cause processor 311 to implement engines 131-134, respectively.

Figure 4:
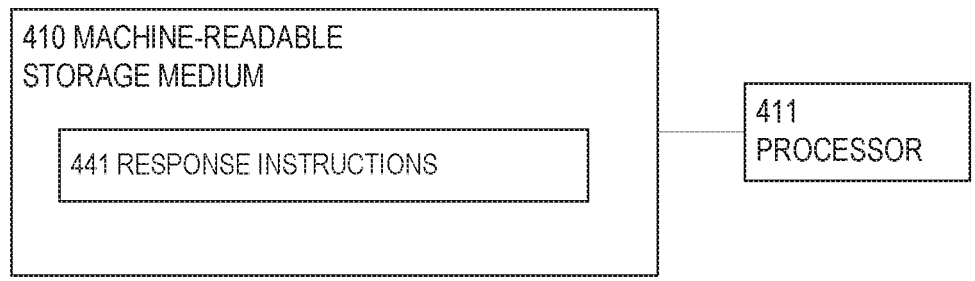
FIG. 4 is a block diagram depicting an example machine-readable storage medium comprising instructions executable by a processor for dynamically adjusting wait time values.

FIG. 4 is a block diagram depicting an example machine-readable storage medium 410 comprising instructions executable by a processor for dynamically adjusting wait time values.

In the foregoing discussion, engine 141 was described as combinations of hardware and programming. Engine 141 may be implemented in a number of fashions. Referring to FIG. 4, the programming may be processor executable instructions 441 stored on a machine-readable storage medium 410 and the hardware may include a processor 411 for executing those instructions. Thus, machine-readable storage medium 410 can be said to store program instructions or code that when executed by processor 411 implements engine 141 of FIG. 1.

In FIG. 4, the executable program instructions in machine-readable storage medium 410 are depicted as response instructions 441. Instructions 441 represent program instructions that, when executed, cause processor 411 to implement engine 141, respectively.

Machine-readable storage medium 310 (or machine-readable storage medium 410) may be any electronic, magnetic, optical, or other physical storage device that contains or stores executable instructions. In some implementations, machine-readable storage medium 310 (or machine-readable storage medium 410) may be a non-transitory storage medium, where the term "non-transitory" does not encompass transitory propagating signals. Machine-readable storage medium 310 (or machine-readable storage medium 410) may be implemented in a single device or distributed across devices. Likewise, processor 311 (or processor 411) may represent any number of processors capable of executing instructions stored by machine-readable storage medium 310 (or machine-readable storage medium 410). Processor 311 (or processor 411) may be integrated in a single device or distributed across devices. Further, machine-readable storage medium 310 (or machine-readable storage medium 410) may be fully or partially integrated in the same device as processor 311 (or processor 411), or it may be separate but accessible to that device and processor 311 (or processor 411).

In one example, the program instructions may be part of an installation package that when installed can be executed by processor 311 (or processor 411) to implement system 100. In this case, machine-readable storage medium 310 (or machine-readable storage medium 410) may be a portable medium such as a floppy disk, CD, DVD, or flash drive or a memory maintained by a server from which the installation package can be downloaded and installed. In another example, the program instructions may be part of an application or applications already installed. Here, machine-readable storage medium 310 (or machine-readable storage medium 410) may include a hard disk, optical disk, tapes, solid state drives, RAM, ROM, EEPROM, or the like.

Processor 311 may be at least one central processing unit (CPU), microprocessor, and/or other hardware device suitable for retrieval and execution of instructions stored in machine-readable storage medium 310. Processor 311 may fetch, decode, and execute program instructions 331-334, and/or other instructions. As an alternative or in addition to retrieving and executing instructions, processor 311 may include at least one electronic circuit comprising a number of electronic components for performing the functionality of at least one of instructions 331-334, and/or other instructions.

Processor 411 may be at least one central processing unit (CPU), microprocessor, and/or other hardware device suitable for retrieval and execution of instructions stored in machine-readable storage medium 410. Processor 411 may fetch, decode, and execute program instructions 441, and/or other instructions. As an alternative or in addition to retrieving and executing instructions, processor 411 may include at least one electronic circuit comprising a number of electronic components for performing the functionality of at least one of instructions 441, and/or other instructions.

Figure 5:
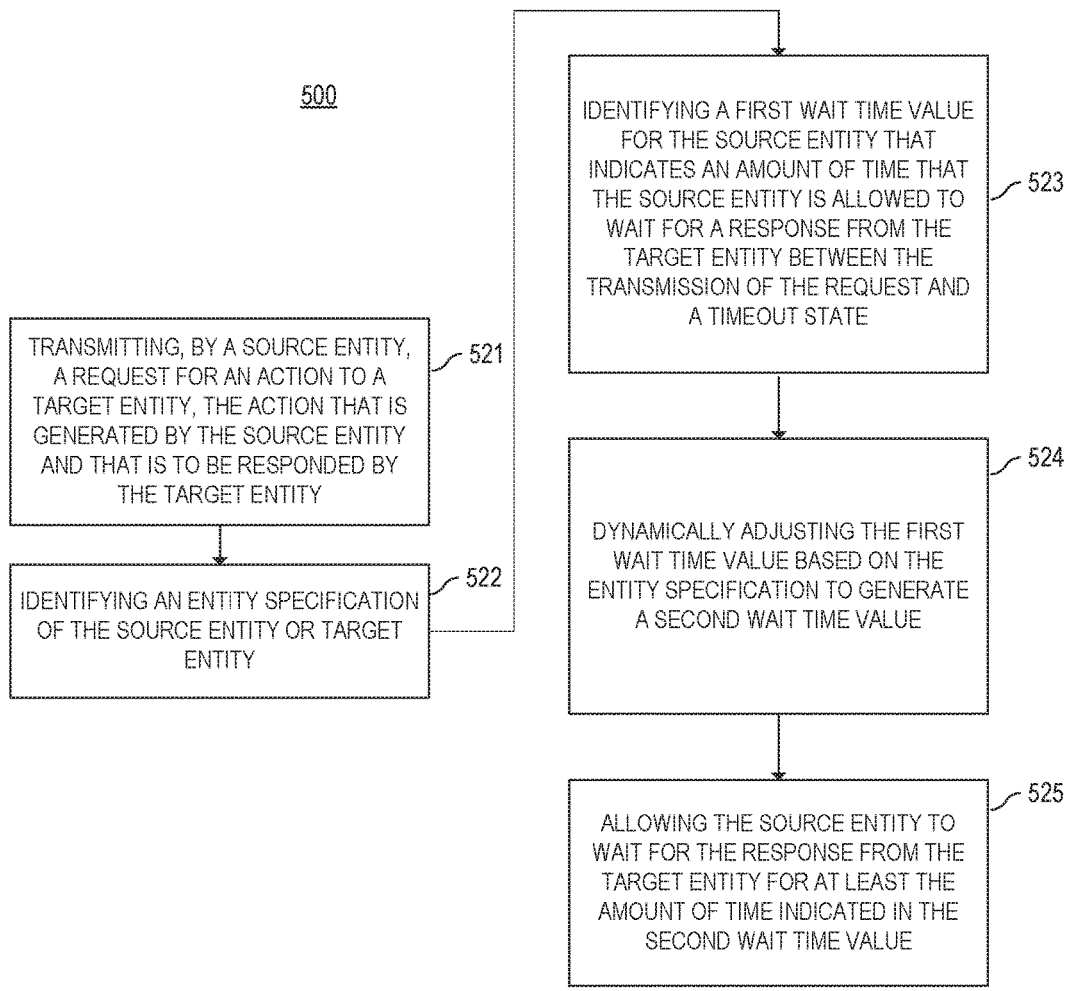
FIG. 5 is a flow diagram depicting an example method for dynamically adjusting wait time values.

FIG. 5 is a flow diagram depicting an example method 500 for dynamically adjusting wait time values. The various processing blocks and/or data flows depicted in FIG. 5 (and in the other drawing figures such as FIG. 6) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 500 as illustrated (and described in greater detail below) is meant to be an example and, as such, should not be viewed as limiting. Method 500 may be implemented in the form of executable instructions stored on a machine-readable storage medium, such as storage medium 310, and/or in the form of electronic circuitry.

In block 521, method 500 may include transmitting, by a source entity, a request for an action to a target entity, the action that is generated by the source entity and that is to be responded by the target entity.

In block 522, method 500 may include identifying an entity specification of the source entity or target entity.

In block 523, method 500 may include identifying a first wait time value for the source entity that indicates an amount of time that the source entity is allowed to wait for a response from the target entity between the transmission of the request and a timeout state.

In block 524, method 500 may include dynamically adjusting the first wait time value based on the entity specification to generate a second wait time value.

In block 525, method 500 may include allowing the source entity to wait for the response from the target entity for at least the amount of time indicated in the second wait time value.

Referring back to FIG. 1, request engine 131 may be responsible for implementing block 521. Specification engine 132 may be responsible for implementing block 522. Wait time engine 133 may be responsible for implementing blocks 523-525.

Figure 6:
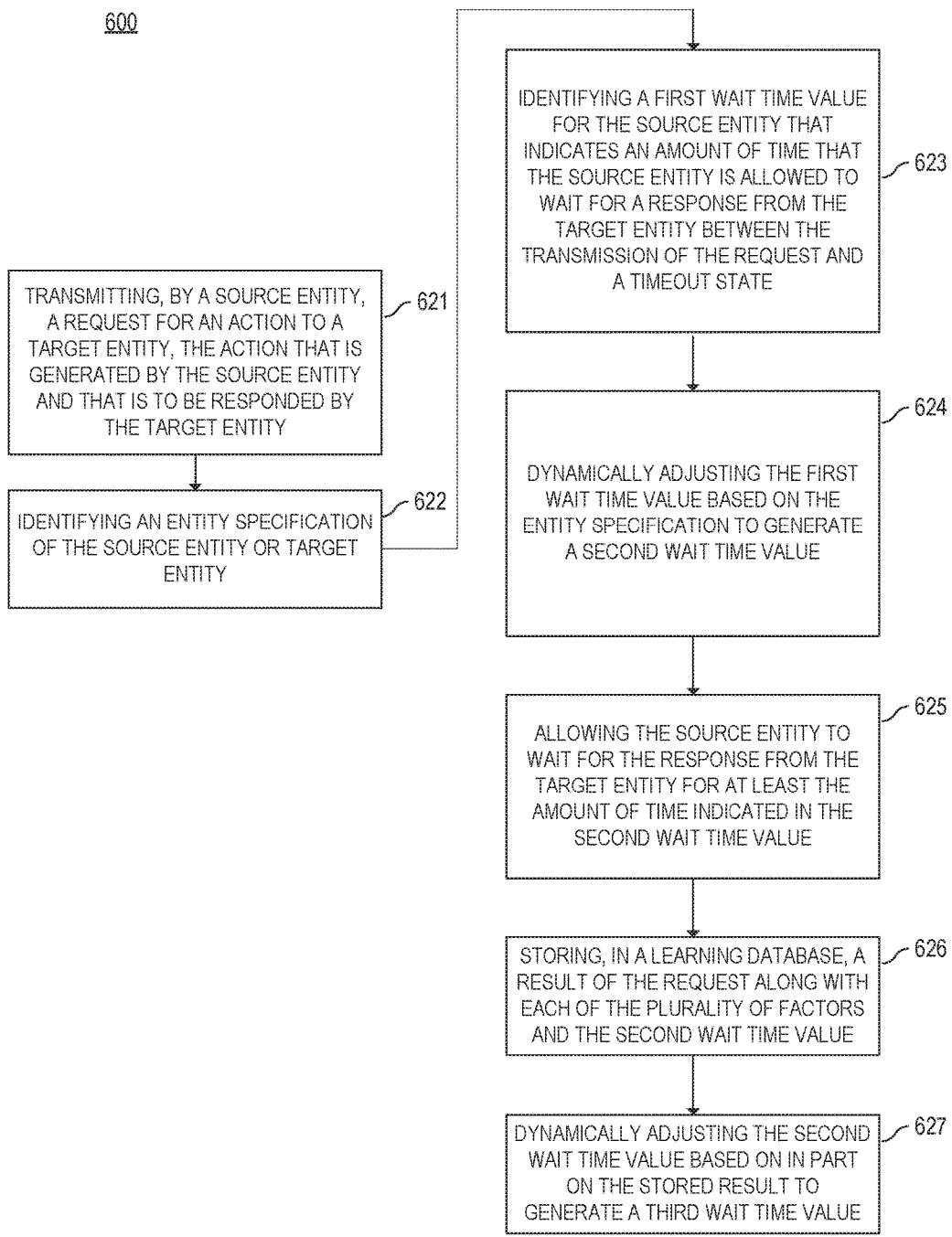
FIG. 6 is a flow diagram depicting an example method for dynamically adjusting wait time values.

FIG. 6 is a flow diagram depicting an example method 600 for dynamically adjusting wait time values. Method 600 as illustrated (and described in greater detail below) is meant be an example and, as such, should not be viewed as limiting. Method 600 may be implemented in the form of executable instructions stored on a machine-readable storage medium, such as storage medium 310, and/or in the form of electronic circuitry.

In block 621, method 600 may include transmitting, by a source entity, a request for an action to a target entity, the action that is generated by the source entity and that is to be responded by the target entity.

In block 622, method 600 may include identifying an entity specification of the source entity or target entity.

In block 623, method 600 may include identifying a first wait time value for the source entity that indicates an amount of time that the source entity is allowed to wait for a response from the target entity between the transmission of the request and a timeout state.

In block 624, method 600 may include dynamically adjusting the first wait time value based on the entity specification to generate a second wait time value.

In block 625, method 600 may include allowing the source entity to wait for the response from the target entity for at least the amount of time indicated in the second wait time value.

In block 626, method 600 may include storing, in a learning database, a result of the request along with each of the plurality of factors and the second wait time value. The entity specification comprises the plurality of factors.

In block 627, method 600 may include dynamically adjusting the second wait time value based on in part on the stored result to generate a third wait time value.

Referring back to FIG. 1, request engine 131 may be responsible for implementing block 621. Specification engine 132 may be responsible for implementing block 622. Wait time engine 133 may be responsible for implementing blocks 623-625. Learning engine 134 may be responsible for implementing blocks 626-627.

The foregoing disclosure describes a number of example implementations for dynamic adjustment of wait time values. The disclosed examples may include systems, devices, computer-readable storage media, and methods for dynamic adjustment of wait time values. For purposes of explanation, certain examples are described with reference to the components illustrated in FIGS. 1-4. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 5-6 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method for dynamically adjusting wait time values, the method comprising:
    transmitting, by a source entity, a request for an action to a target entity;
    identifying an entity specification of the target entity, the entity specification comprising a hardware specification that describes a characteristic of a hardware component of the target entity;
    identifying a first wait time value for the source entity that indicates an amount of time that the source entity is allowed to wait for a response from the target entity between the transmission of the request and a timeout state;
    dynamically adjusting the first wait time value based on the hardware specification to generate a second wait time value; and
    allowing the source entity to wait for the response from the target entity for at least an amount of time indicated by the second wait time value.

2. The method of claim 1, comprising:
    determining that the timeout state occurs responsive to detecting that the response has not been received from the target entity within the amount of time indicated by the second wait time value after transmitting the request to the target entity.

3. The method of claim 1, wherein dynamically adjusting the first wait time value based on the hardware specification to generate the second wait time value comprises:
    dynamically adjusting the first wait time value before a state of the source entity indicates a wait state.

4. The method of claim 3, wherein the second wait time value indicates the amount of time from the wait state to the timeout state.

5. The method of claim 1, wherein the action relates to at least one of:
    a command distribution;
    a process execution; or
    a communication protocol.

6. The method of claim 1, wherein the entity specification further comprises an events specification comprising information about an error event at the target entity, and
    wherein dynamically adjusting the first wait time value to generate the second wait time value is further based on the events specification.

7. The method of claim 1, wherein identifying the entity specification comprises:
    pinging the target entity for the entity specification; and
    receiving the entity specification from the target entity.

8. The method of claim 6, wherein identifying the entity specification comprises:
    receiving information in a system log of the target entity; and
    determining the events specification based on the information in the system log.

9. The method of claim 1, wherein the entity specification comprises a plurality of factors, the method further comprising:
    storing, in a learning database, a result of the request along with each of the plurality of factors and the second wait time value; and
    dynamically adjusting the second wait time value based on the stored result to generate a third wait time value.

10. A non-transitory machine-readable storage medium comprising instructions that upon execution cause a source entity to:
    identify an entity specification for a target entity, the entity specification comprising a software specification that describes a characteristic of a software of the target entity;
    dynamically adjust a wait time from a first wait time value to a different second wait time value based on the software specification, the wait time indicating an amount of time that the source entity is allowed to wait for a response to a request before a timeout at the source entity;
    send the request from the source entity to the target entity; and determine whether to timeout at the source entity based on whether the response to the request has been received from the target entity within the wait time set to the second wait time value.

11. The non-transitory machine-readable storage medium of claim 10, wherein the request is a first request, and the instructions upon execution cause the source entity to:
store, in a learning database, a result of the first request along with the second wait time value and along with at least one of a plurality of factors in the entity specification of the target entity;
dynamically adjust the wait time from the second wait time value to a third time value based on the stored result in the learning database;
send a second request from the source entity to the target entity; and
allow the source entity to wait for a second response in response to the second request for at least an amount of time indicated by the third wait time value.

12. The non-transitory machine-readable storage medium of claim 10, wherein the instructions upon execution cause the source entity to:
dynamically adjust the wait time based on a network condition between the source entity and the target entity.

13. The non-transitory machine-readable storage medium of claim 10, wherein the entity specification further comprises a hardware specification that describes a characteristic of a hardware component of the target entity, and wherein dynamically adjusting the wait time from the first wait time value to the different second wait time value is further based on the hardware specification.

14. The non-transitory machine-readable storage medium of claim 10, wherein the software specification identifies a version of an operating system at the target entity, and wherein dynamically adjusting the wait time from the first wait time value to the different second wait time value is based on the version of the operating system at the target entity.

15. A system comprising:
a hardware processor; and
a non-transitory storage medium storing instructions executable on the hardware processor to:
identify an entity specification for a target entity, the entity specification comprising at least one of a hardware specification of the target entity or a software specification of the target entity, the hardware specification describing a characteristic of a hardware component of the target entity, and the software specification describing a characteristic of a software of the target entity;
dynamically adjust a wait time from a first wait time value to a different second wait time value based on the at least one of the hardware specification or the software specification, the wait time indicating an amount of time that the source entity is allowed to wait for a response to a request before a timeout at the source entity;
send the request from the source entity to the target entity; and
determine whether to timeout at the source entity based on whether the response to the request has been received from the target entity within the wait time set to the second wait time value.

16. The method of claim 1, wherein the hardware specification describes a characteristic of a processor of the target entity.

17. The method of claim 1, wherein the hardware specification describes a characteristic of a memory of the target entity.

18. The method of claim 1, wherein the hardware specification describes a characteristic of a network interface controller of the target entity.

19. The method of claim 1, wherein the entity specification further comprises a software specification that describes a characteristic of a software of the target entity, and wherein dynamically adjusting the first wait time value to generate the second wait time value is further based on the software specification.

20. The system of claim 15, wherein the entity specification comprises both the hardware specification and the software specification, and wherein dynamically adjusting the wait time from the first wait time value to the different second wait time value is based on the hardware specification and the software specification.

* * * * *